United States Patent [19]

Koch, deceased et al.

[11] Patent Number: 4,815,262
[45] Date of Patent: Mar. 28, 1989

[54] DISC CUTTERBAR CONSTRUCTION

[75] Inventors: Earl E. Koch, deceased, late of Mohnton, Pa., by Agnes E. Koch, legal representative; Franja F. Voler, New Holland, Pa.

[73] Assignee: Ford New Holland, Inc., New Holland, Pa.

[21] Appl. No.: 99,970

[22] Filed: Sep. 23, 1987

Related U.S. Application Data

[63] Continuation-in-part of Ser. No. 846,650, Mar. 31, 1986, abandoned.

[51] Int. Cl.⁴ ............................................. A01D 34/63
[52] U.S. Cl. ........................................... 56/13.6; 56/6
[58] Field of Search ............................... 56/136, 6, 192

[56] References Cited

U.S. PATENT DOCUMENTS

| | | | |
|---|---|---|---|
| 4,157,004 | 6/1979 | Vanderlehy | 56/13.6 |
| 4,201,033 | 5/1980 | Meek et al. | 56/13.6 |
| 4,231,216 | 11/1980 | Weber | 56/13.6 |
| 4,426,828 | 1/1984 | Neuerberg | 56/13.6 |
| 4,468,916 | 9/1984 | Vissers et al. | 56/13.6 |
| 4,633,656 | 1/1987 | Willinger | 56/13.6 |
| 4,693,062 | 7/1987 | Vanderlehy et al. | 56/13.6 |

FOREIGN PATENT DOCUMENTS

| | | | |
|---|---|---|---|
| 2068206 | 8/1981 | United Kingdom | 56/13.6 |
| 2166032 | 4/1986 | United Kingdom | 56/13.6 |

Primary Examiner—John Weiss
Attorney, Agent, or Firm—Larry W. Miller; Frank A. Seemar; Darrell F. Marquette

[57] ABSTRACT

An improved disc cutterbar construction is disclosed wherein the cutterbar casing is provided with a rearwardly extending flange and a plurality of forwardly projecting mounting tabs. A wear plate is connected underneath the casing by fasteners extending through the flange and other fasteners interconnecting brackets on the wear plate and mounting tabs on the casing. Semi-circular guards are detachably connected by fasteners engaged with mounting arms forwardly extending from the wear plate. Skid shoes are provided with a hook portion that engages into a slotted opening in the guard members and are fastened to the casing flange by the fasteners connecting the wear plate to the casing.

11 Claims, 6 Drawing Sheets

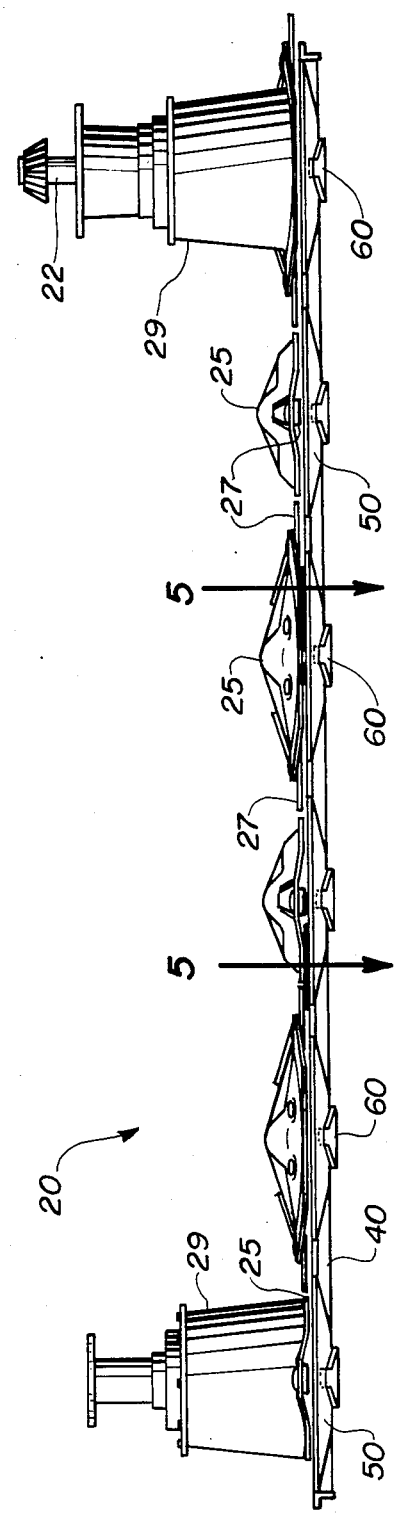
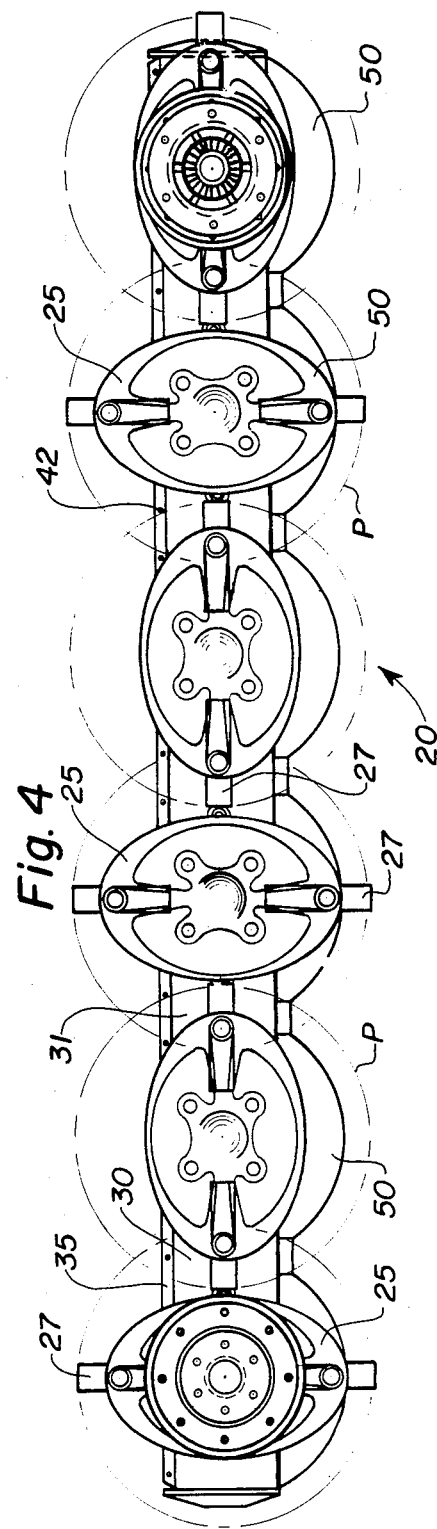

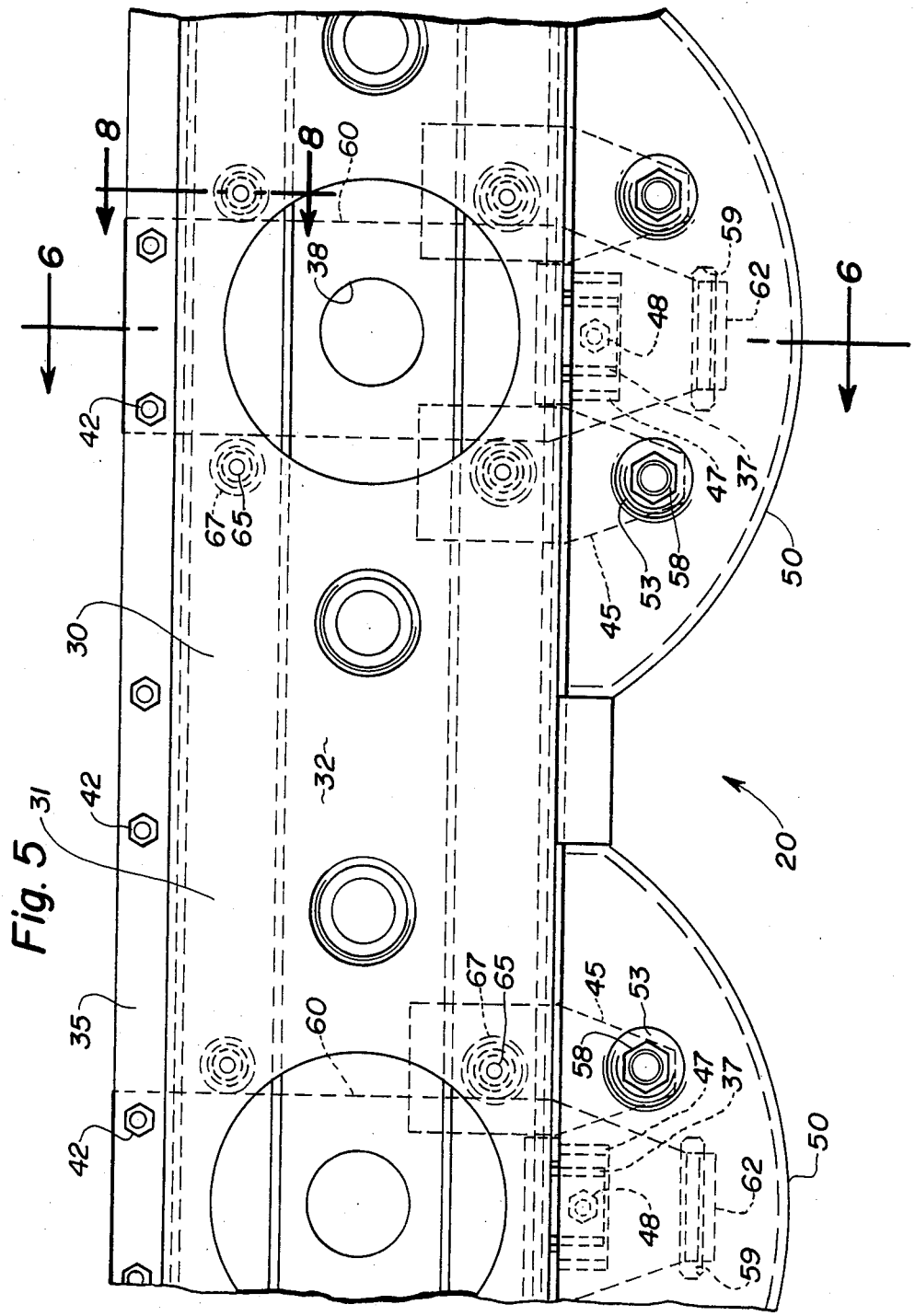

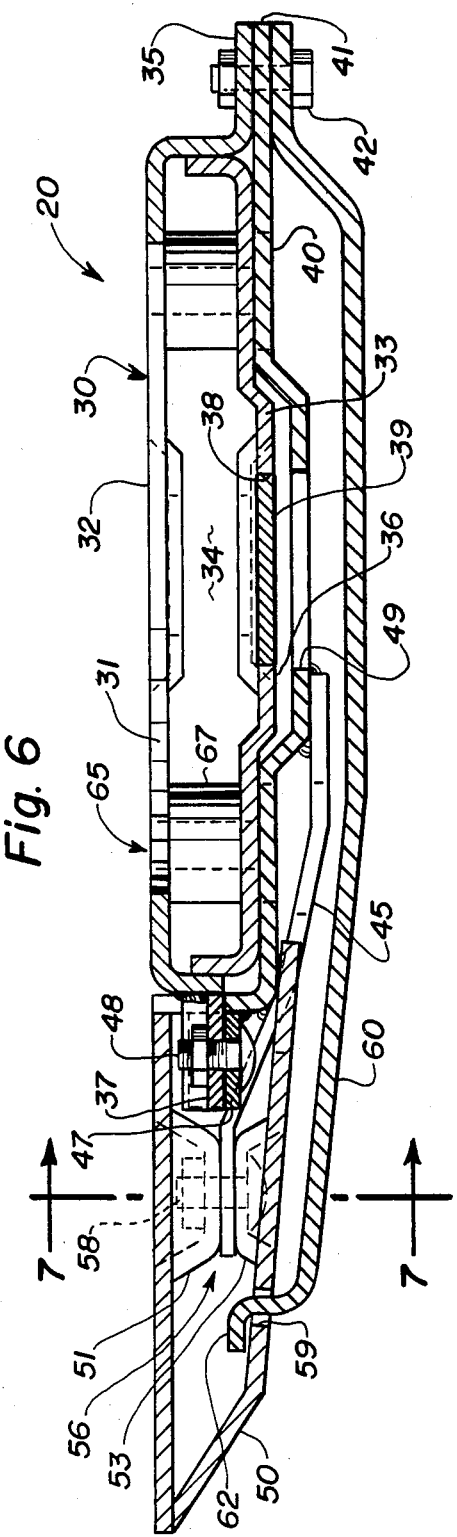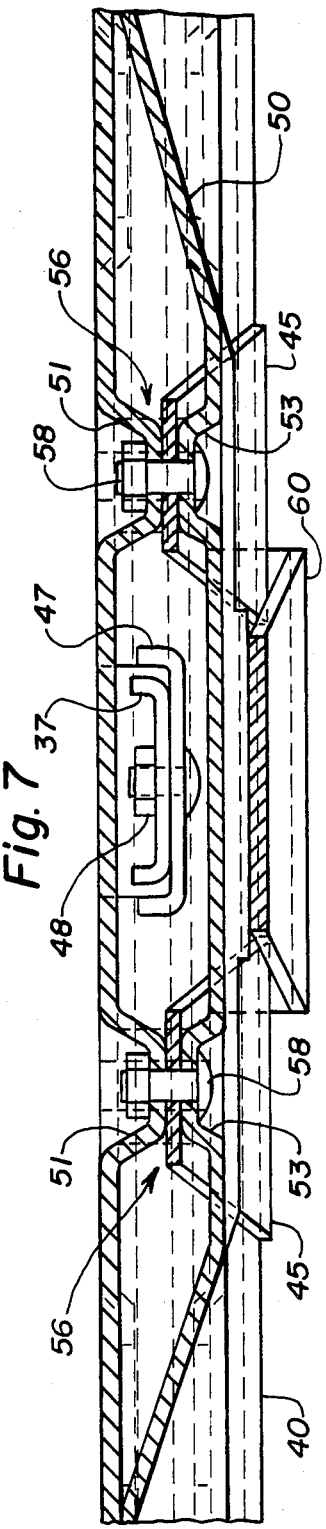

DISC CUTTERBAR CONSTRUCTION

CROSS REFERENCE TO RELATED APPLICATIONS

This application is a continuation-in-part of U.S. patent application Ser. No. 846,650 filed Mar. 31, 1986, abandoned 4/08/88.

BACKGROUND OF THE INVENTION

The present invention relates generally to rotary mowers used for severing standing crop material by impact action and, more particularly, to an improved disc cutterbar construction for use with disc mowers and disc mower-conditioners.

Disc cutterbars of the type utilizing a plurality of intermeshed gears to transfer rotational power to the rotatably supported disc cutters, have evolved over the years from a pair of hat-shaped sections sealingly fastened together for creating the transmission casing to a welded unitary elongated section of the type seen in U.S. Pat. No. 4,443,998. This latter type of disc cutterbar casing is particularly susceptible to operational impediment due to damage to the casing because of the relatively close tolerances allotted to the rotating gears mounted within the casing.

The addition of further protective structure, such as wear plates and skid shoes, further detracts from the serviceability of such disc cutterbars. Nevertheless, such additional protective structure is important for the functional operation of the cutterbar, particularly when operating in abrasive soil conditions, including rocks and other obstacles. Eventually, however, the wearing parts of the cutterbar, e.g., the guard members, skid shoes, etc., will require replacement and serviceability then becomes of prime importance. It would be particularly advantageous to the type of cutterbar seen in U.S. Pat. No. 4,443,998 to permit serviceability of these structural elements without disturbing the mounting of the rotor assembly within the cutterbar. Since this particular cutterbar construction utilizes common fasteners for mounting the wearing members and the bearing housing for the disc cutter assemblies, it is necessary to remove these bolts to replace these wearing elements.

Accordingly, it would be advantageous to provide a disc cutterbar construction that would permit selective service of the disc cutter assemblies and/or the cutterbar protective members as needed.

SUMMARY OF THE INVENTION

It is an object of this invention to overcome the aforementioned disadvantages of the prior art by providing a disc cutterbar construction for a compact disc cutterbar mechanism having the protective structural members mounted independently from the disc cutter assemblies.

It is another object of this invention to permit service and/or replacement of the protective members of the cutterbar independently of the disc cutter assemblies.

It is a feature of this invention that serviceability of the disc cutterbar is improved.

It is an advantage of this invention that the disc cutter assemblies do not need to be disturbed to service the protective members or vice versa.

It is another feature of this invention that the guard members and/or skid shoes can be removed from the disc cutterbar without removal of the wear plate from the cutterbar casing.

It is yet another feature of this invention that the wear plate can be removed from the cutterbar casing without disturbing the bearing mountings for the disc cutter assemblies.

It is another advantage of this invention that the overall height of the disc cutterbar is not increased.

It is still another advantage of this invention that the disc cutterbar assemblies can be serviced without disturbing the mounting of the wear plate to the transmission casing.

It is yet another object of this invention to provide a disc cutterbar for use in a mower or mower-conditioner which is durable in construction, inexpensive of manufacture, carefree of maintenance, facile in assemblage, and simple and effective in use.

These and other objects, features and advantages are accomplished according to the instant invention by providing an improved disc cutterbar construction wherein the cutterbar casing is provided with a rearwardly extending flange and a plurality of forwardly projecting mounting tabs. A wear plate is connected underneath the casing by fasteners extending through the flange and other fasteners interconnecting brackets on the wear plate and mounting tabs on the casing. Semicircular guards are detachably connected by fasteners engaged with mounting arms forwardly extending from the wear plate. Skid shoes are provided with a hook portion that engages into a slotted opening in the guard members and are fastened to the casing flange by the fasteners connecting the wear plate to the casing.

BRIEF DESCRIPTION OF THE DRAWINGS

The advantages of this invention will become apparent upon consideration of the following detailed disclosure of the invention, especially when taken in conjunction with the accompanying drawings, wherein:

FIG. 3 is a view of the disc cutterbar as seen along lines 3—3 of FIG. 2, with the extraneous harvester structure removed;

FIG. 4 is a top plan of the disc cutterbar seen in FIG. 3;

FIG. 5 is an enlarged partial cross-sectional view of the disc cutterbar taken along lines 5—5 of FIG. 3 to show the structural features of the transmission casing and protective elements with the disc cutter assemblies and transmission gears removed;

FIG. 6 is a cross-sectional view of the transmission casing and protective elements seen in FIG. 5 taken along lines 6—6;

FIG. 7 is a cross-sectional view of the transmission casing and protective elements as seen in FIG. 6, taken along lines 7—7.

DETAILED DESCRIPTION OF THE PREFERRED EMBODIMENT

Figure 1:
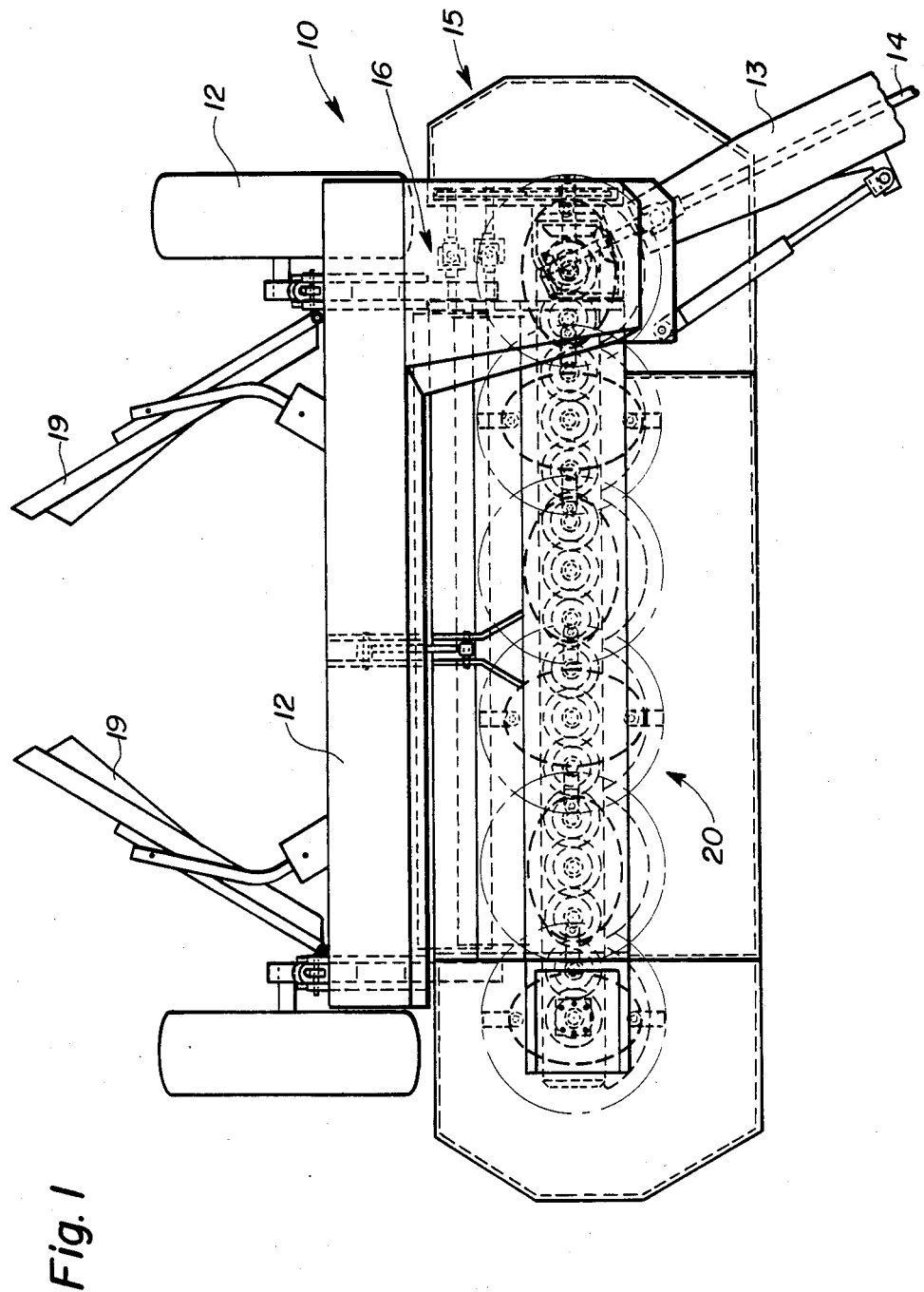
FIG. 1 is a top plan view of a disc mower-conditioner incorporating the principles of the instant invention.
Figure 2:
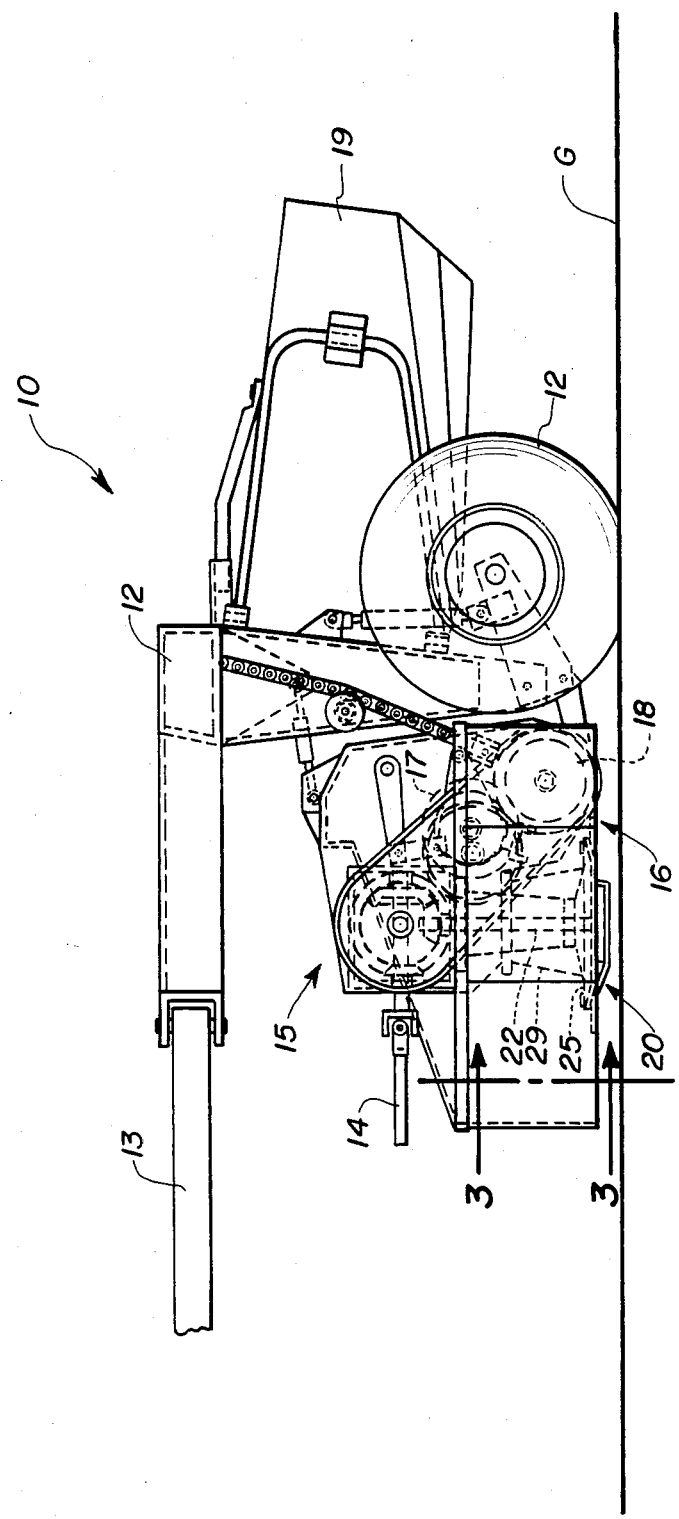
FIG. 2 is a left side elevational view of the disc mower-conditioner seen in FIG. 1.
Figure 8:
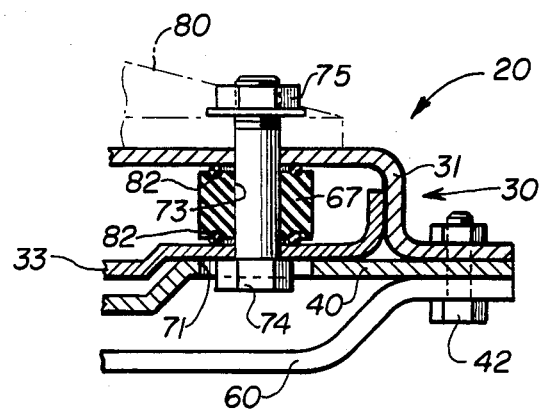
FIG. 8 is a partial cross-sectional detail view taken along lines 8—8 of FIG. 5, the bearing housing being shown in phantom.

Referring now to the drawings and, particularly, to FIG. 1, a top plan view of a crop harvesting machine, commonly referred to a disc mower-conditioner, incorporating the principles of the instant invention, can be seen. Any left and right references are used as a matter of convenience and are determined by standing at the rear of the machine, facing the forward end, the direction of travel. As best seen in FIGS. 1 and 2, the disc mower-conditioner 10 is supported over the ground G by a wheeled frame 12. The embodiment as shown in the drawings is commonly referred to as a pull-type machine and, therefore, is equipped with a draft tongue 13 and a PTO driveline 14 to input rotational power from a pulling tractor (not shown).

The machine 10 is provided with a header 15 floatingly supported from the frame 12 in a conventional manner. The header 15 is provided with a disc cutterbar 20, described in further detail below, and a conditioning mechanism 16, including an upper roll 17 and a lower roll 18, positioned immediately rearwardly of the cutterbar 20 to receive and condition severed crop. The discharge of conditioned crop material from the conditioning mechanism 16 is engaged with the rearwardly converging baffle shields 19 that deposit the conditioned crop into a consolidated windrow upon the ground G in a conventional manner.

The disc cutterbar 20 is best seen in FIGS. 3 and 4. The power input shaft 22 receives rotational power from the PTO driveline 14 and transfers the rotational power through a series of intermeshing gears (not shown) in a conventional manner to rotatably power the operation of the disc cutter assemblies 25 having a pair of outwardly extending knives 27 that engage the standing crop material and, by rotation shown by the circular arc affect a severing thereof from the ground. One skilled in the art will readily realize that the transmission gearing (not shown) within the cutterbar casing 30 is arranged in a conventional manner with a pair of idler gears disposed between each drive gear for the respective disc cutter assemblies 25 so that adjacent cutter assemblies 25 rotate in opposing directions. The disc cutter assemblies 25 at the ends of the cutterbar 20 are provided with a hat-shaped divider drum 29 to better control the flow of crop material over the cutterbar 20.

Referring now to FIGS. 3-8, the construction and assemblage of the various parts comprising the protective members for the cutterbar 20 can best be seen. The transmission casing 30 is comprised of a pair of inwardly directed generally U-shaped members welded together to form an elongated integral member. The upper member 31 defines the upper surface 32 of the transmission casing over which the disc cutter assemblies 25 operatively rotate. The lower member 33 defines a lower surface 36 spaced below the upper surface 32 to form a hollow cavity 34 therebetween. The casing 30 is provided with a rearwardly projecting flange 35 extending along the length of the casing 30. A generally U-shaped mounting tab 37 is affixed, such as by welding, to the casing 30 to project forwardly therefrom at locations in front of the casing 30 corresponding to the axis of rotation of the disc cutter assemblies 25. The lower surface 36 of the casing 30 is provided with a hole 38 beneath the disc cutter assemblies 25 to permit access thereto. The hole 38 is sealed with a seal 39 to maintain an oil tight cavity 34.

The wear-plate 40 is provided with a rearward edge portion 41 connected to the casing flange 35 by a series of fasteners 42. A plurality of mounting arms 45 are welded to the wear plate 40 and project forwardly therefrom to permit a mounting of guard members, as discussed in greater detail below. The forward portion of the wear plate 40 is provided with a generally U-shaped connecting bracket 47 positioned to correspond to each respective mounting tab 37 on the casing 30. As best seen in FIG. 7, the connecting bracket 47 is slightly larger than the mounting tab 37 to permit the mounting tab 37 to be nested within the connecting bracket 47. A fastener 48 connects the bracket 47 to the mounting tab 37 and, therefore, affixes the wear plate 40 to the transmission casing 30. The wear plate 40 is also provided with an opening 49 positioned immediately beneath the access hole 38 to permit access to the disc cutter assembly 25 without the need to completely remove the wear plate 40 from the cutterbar casing 30.

The cutterbar 20 is also provided with a plurality of guard members 50 which are generally semi-circular in shape and are positioned beneath the circular path of travel of the disc cutter assemblies 25 forwardly of the cutterbar casing 30. Each guard 50 is mounted on a pair of the mounting arms 45 extending from the wear plate 40. Each mounting location of the guard member 50 is formed by a downwardly depressed portion 51 and an upwardly depressed portion 53 terminating in a spaced apart relationship to form a gap 56 therebetween. The mounting arm 45 is positionable in the gap 56 so that a fastener 58 extending between the upwardly depressed portion 53 and the downwardly depressed portion 51 will fasten the guard member 50 to the mounting arm 45 and, therefore, to the wear plate 40. Each guard member 50 is also provided with a slotted hole 59 in the lower portion thereof to permit engagement with the skid shoe 60.

The skid shoes 60 are positioned beneath the disc cutter assemblies 25 to engage the surface of the ground G and elevate the casing 30 and attached wear plate 40 slightly above the surface of the ground. Each skid shoe 60 is provided with a hook portion 62 which is positionable within the slotted hole 59 in the corresponding guard member 50 to positionally fix the skid shoe 60 relative to the guard member 50. The skid shoes 60 are then fastened at the rear to the rearward flange 35 of the casing 30 and the rearward edge portion 41 of the wear plate 40 by the fasteners 42.

The wear plate 40 is provided with an opening 71 therethrough concentrically aligned with the hole 73 through the spacer 67 and the corresponding openings 65 in the cutterbar 20. The opening 71 is sufficiently large in diameter to accommodate the bolt head 74 of the connecting hardware 75, extending through the cutterbar 20 and the spacer 67 for engagement with the bearing housing 80, so that the bolt head 74 bears against the lower member 33 of the transmission casing 30 and not against the wear plate 40. The bearing housing 80 is described in greater detail in co-pending U.S. patent application Ser. No. 846,655, filed Mar. 31, 1986, and entitled "Disc Cutter Rotor Assembly", the descriptive portions of which are hereby incorporated herein by reference. The connecting hardware 75 detachably mounts the bearing housing 80 to the upper member 31 by bearing against the lower member 33 and extending upwardly through the transmission casing 20 and spacer 67, without engaging the wear plate 40.

Accordingly, it can be seen that the protective members, i.e., wear plate 40, guard members 50 and skid shoes 60, can be removed from the cutterbar 20 without affecting any disassembly of the casing 20, disturbing the mounting of the bearing housing 80, or disrupting the oil tight integrity of the transmission casing 20, maintained by the compression of the O-rings 82 between the spacer 67 and the upper and lower members 31,33 generated by the tightening of the connecting hardware 75. Likewise, the bearing housing 80 or disc cutter assemblies 25 can also be serviced, repaired or replaced without the need to remove or disassemble any of the aforementioned cutterbar protective members.

It will be understood that changes in the details, materials, steps and arrangement of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. In a disc cutterbar for severing standing crop material from the ground and having an elongated casing including an upper surface and a spaced apart lower surface; disc cutter assemblies rotatably supported by said casing above said upper surface; transmission means mounted within said casing and operatively connected to said disc cutter assemblies to transfer rotational power thereto, said transmission means being connected to drive means for supplying said rotational power; a wear plate connected to said casing along the length thereof to protect said lower surface from damage; guard means forwardly extending from said casing and positioned to protect the forwardly extending path of rotational travel described by said disc cutter assemblies above and forwardly of said casing; and skid shoes positioned below said wear plate to engage the ground and elevate said casing and said wear plate above the ground during operation of said disc cutterbar over the ground, an improved disc cutterbar construction comprising:

said casing being formed with a rearwardly extending flange and forwardly projecting mounting tabs;

said wear plate having a rearward edge portion and forwardly extending connecting brackets corresponding to the mounting tabs of said casing, said wear plate being detachably connected beneath said casing by first fasteners interconnecting corresponding mounting tabs and connecting brackets and by second fasteners interconnecting said rearward edge portion and said casing flange, said wear plate being removable from said casing without disassembling said casing.

2. The disc cutterbar of claim 1 wherein said guard means comprise guard members connected to said wear plate and extends forwardly thereof in front of corresponding said disc cutter assemblies.

3. The disc cutterbar of claim 2 wherein said skid shoes are fastened to said casing flange and connected to a corresponding guard member.

4. The disc cutterbar of claim 3 wherein said wear plate is provided with two forwardly extending mounting arms for each guard member mounted thereon, each said guard member being detachably connected to the corresponding said mounting arms by third fasteners.

5. The disc cutterbar of claim 4 wherein each said guard member has a pair of upwardly depressed portions and a pair of corresponding downwardly depressed portions terminating in a spaced apart relationship, each respective said mounting arm being positionable between corresponding upwardly and downwardly depressed portions to permit the connection of the guard member by said third fasteners interconnecting the respective mounting arms and corresponding depressed portions.

6. The disc cutterbar of claim 5 wherein each said guard member mounting a skid shoe is formed with a slotted opening therein, each said skid shoe having a hook portion positionable within said slotted opening in the corresponding guard member to positionally retain said skid shoe relative to the corresponding said guard member, each said skid shoe being connected to said casing flange and said rearward edge portion by said second fasteners.

7. The disc cutterbar of claim 6 wherein said mounting tabs and said connecting brackets have U-shaped cross-sectional configurations, said mounting tabs being smaller than the corresponding connecting brackets to permit said mounting tabs to be nested within said connecting brackets.

8. A disc cutterbar operable to sever standing crop from the ground comprising:

an elongated casing having an upper surface and a spaced apart lower surface and forming a hollow cavity therebetween, said casing being a fluid-tight housing for supporting a plurality of disc cutter assemblies rotatable above said upper surface and reaching forwardly of said casing along a circular path of travel to sever standing crop material becoming engaged therewith, said casing also supporting transmission means housed within said cavity to transfer rotational power from an external drive means to said disc cutter assemblies, said casing being provided with a rearwardly extending flange and a plurality of forwardly extending mounting tabs;

a wear plate connected to said casing along the length thereof to protect said lower surface of said casing from damage, said wear plate having a plurality of connecting brackets extending forwardly therefrom and connectable to said mounting tabs by first fasteners, said wear plate further having a rearward edge portion connectable to said casing flange by second fasteners and a plurality of spaced apart mounting arms projecting forwardly of said casing, said wear plate being removable from said casing without disturbing the fluid-tight integrity of said casing;

a guard member corresponding to each said disc cutter assembly and being connected by third fasteners to two of said mounting arms forwardly of said casing beneath the circular path of travel of the corresponding disc cutter assembly for protection thereof from damage; and a skid shoe for engaging the surface of the ground and elevating said casing and said wear plate above the ground during operation of said disc cutterbar, said skid shoe being supported on each said guard member and connected to said casing flange and the rearward portion of said wear plate by said second fasteners.

9. The disc cutterbar of claim 8 wherein each said guard member has a pair of upwardly depressed portions and a pair of corresponding downwardly depressed portions terminating in a spaced apart relationship, each said mounting arm being positionable between corresponding upwardly and downwardly depressed portions to permit the connection of the guard member by said third fasteners interconnecting the respective mounting arms and corresponding depressed portions.

10. The disc cutterbar of claim 8 wherein each said guard member has a slotted opening therein, each said skid shoe having a hook portion engageable with the slotted opening in the corresponding said guard member to positionally fix the skid shoe to the corresponding guard member.

11. The disc cutterbar of claim 10 wherein said mounting tabs and said connecting brackets have U-shaped cross-sectional configurations, said mounting tabs being smaller than the corresponding connecting brackets to permit said mounting tabs to be nested within said connecting brackets.

* * * * *